(12) United States Patent  (10) Patent No.: US 8,676,122 B2
Piesinger  (45) Date of Patent: Mar. 18, 2014

(54) SECURE SATELLITE MODEM FOR PERSONAL DIGITAL ASSISTANT METHOD AND APPARATUS

(76) Inventor: Gregory H. Piesinger, Cave Creek, AZ (US)

( * ) Notice: Subject to any disclaimer, the term of this patent is extended or adjusted under 35 U.S.C. 154(b) by 294 days.

(21) Appl. No.: 13/217,575

(22) Filed: Aug. 25, 2011

(65) Prior Publication Data

US 2012/0051405 A1 Mar. 1, 2012

Related U.S. Application Data

(60) Provisional application No. 61/402,297, filed on Aug. 27, 2010.

(51) Int. Cl.
*H04B 7/00* (2006.01)
*H04B 7/185* (2006.01)
*H04W 4/00* (2009.01)

(52) U.S. Cl.
USPC .......................... 455/41.2; 455/12.1; 455/466

(58) Field of Classification Search
USPC ...................... 455/404.2, 41.2, 466
See application file for complete search history.

(56) References Cited

U.S. PATENT DOCUMENTS

| | | | |
|---|---|---|---|
| 7,805,243 B2 | 9/2010 | Gasvarro et al. | |
| 2003/0171097 A1* | 9/2003 | Soejima et al. | 455/12.1 |
| 2004/0096058 A1* | 5/2004 | Cho et al. | 380/28 |
| 2006/0242127 A1* | 10/2006 | Boone et al. | 707/3 |
| 2008/0065905 A1* | 3/2008 | Salessi | 713/193 |
| 2008/0167031 A1* | 7/2008 | Sorber et al. | 455/426.1 |
| 2008/0175501 A1* | 7/2008 | Renshaw et al. | 382/243 |
| 2009/0121930 A1* | 5/2009 | Bennett et al. | 342/357.07 |
| 2009/0254572 A1* | 10/2009 | Redlich et al. | 707/10 |
| 2009/0270110 A1* | 10/2009 | Ardalan | 455/456.1 |
| 2010/0142427 A1 | 6/2010 | Ramsey | |
| 2011/0092158 A1 | 4/2011 | Plamondon | |
| 2011/0136428 A1 | 6/2011 | Ritter | |
| 2011/0177790 A1 | 7/2011 | Monte et al. | |

OTHER PUBLICATIONS

Plamondon, U.S. Appl. No. 61/249,821, filed Oct. 8, 2009.
Ritter, U.S. Appl. No. 61/283,747, filed Dec. 7, 2009.

* cited by examiner

*Primary Examiner* — Ping Hsieh
*Assistant Examiner* — Xin Jia

(57) ABSTRACT

A system for enabling communication utilizing a satellite communications network includes a mobile communication device and a satellite modem apparatus. A text message is generated at the mobile communication device and transmitted to the satellite modem apparatus using a short range wireless protocol. The satellite modem transmits the text message as a short burst data message to a satellite within the satellite communications system where it is routed to a receiver unit. The satellite modem apparatus does not include a processor. Instead, the mobile communication device includes a processor and program code for generating, transmitting, and receiving text messages, and for encrypting a text message, and/or compressing a text message to a size suitable for transmission via an L-band communications protocol from the satellite modem apparatus.

16 Claims, 8 Drawing Sheets

| Transmitted Data | Data Format | Text Encoded |
|---|---|---|
| 2-bytes | 00X + (X + 6-bit) + 7-bit | 2 text characters |
| 2-bytes | 00X + (X + 6-bit) + 7-bit | 2 text characters |
| 2-bytes | 010 + 13-bit | text word + space |
| 2-bytes | 011 + 13-bit | text phrase + space |
| 2-bytes | 100 + 13-bit | text word + period + space |
| 2-bytes | 101 + 13-bit | text phrase + period + space |
| 2-bytes | 110 + 13-bit | capital text word |
| 2-bytes | 111 + 13-bit | capital text phrase |

FIG. 7

SECURE SATELLITE MODEM FOR PERSONAL DIGITAL ASSISTANT METHOD AND APPARATUS

RELATED INVENTION

The present invention claims priority under 35 U.S.C. §119 (e) to: "Secure Satellite Modem for Personal Digital Assistant Method and Apparatus" Provisional U.S. Patent Application Ser. No. 61/402,297, filed 27 Aug. 2010 which is incorporated by reference herein.

TECHNICAL FIELD OF THE INVENTION

The present invention relates to sending and receiving short satellite text or data messages using an existing personal digital assistant (PDA).

BACKGROUND OF THE INVENTION

The term PDA was first used in 1992 to refer to the Apple Newton. The term also referred to a palmtop computer which was a mobile device that functioned as a personal information manager and had the ability to connect to the Internet. In general, PDAs are an electronic device which can include some of the functions of a computer, cell phone, music player, camera, etc. Today the term can refer to all smartphones, many cell phones, netbook personal computers (PCs), and other small mobile computing devices. Most PDAs can access the Internet via Wi-Fi or Wireless Wide Area Networks (WWANs).

Outside of cellular range, PDAs lose all features that depend on communication services unless they have access to satellite communication services. Satellite phones are available but they are generally larger, more expensive to buy, and satellite airtime service costs much more than cellular service. For day to day use, most consumers carry a cell phone, smartphone, or other type of PDA. If a satellite phone is required, it is usually carried in addition to their normal PDA since their carried PDA contains and manages their phone and email contact information along with other personal information such as appointment schedules.

Today, with many users communicating by text and email messaging, there is a need for a small low cost easy to use satellite modem that can be used with their existing PDA to send short text or data messages when outside cellular range. With such a device, the PDA user is never out of communication range and can continue to use his existing familiar PDA which contains and manages all of his personal information.

Since satellite text messages pass through multiple wireless channels including the Internet before they reach their final destination, there is also a need to guarantee that proprietary or sensitive messages are sent and received securely.

Another desired feature is a 24/7 emergency and concierge service to which users can contact to report an emergency or to obtain answers to general information questions.

Accordingly, it is the object of the present invention to disclose methods and apparatus which provide a new low cost external "black box" secure satellite modem system that can be used with existing PDAs.

SUMMARY OF THE INVENTION

Briefly, to achieve the desired object of the present invention, an Iridium satellite Short Burst Data (SBD) transceiver is combined with a bluetooth communication module to implement a "black box" satellite modem. The PDA communicates with this satellite modem using its bluetooth, computation, and human interface resources.

A custom software application is installed on the PDA to control the satellite modem using low level SBD transceiver AT commands. This custom application also forms and processes SBD data packets to and from the SBD transceiver. Various existing PDA hardware and software resources are used by the custom application to avoid having to duplicate any of these resources in the satellite modem. For example, most PDAs already contain a Global Positioning System (GPS) receiver and GPS applications so a separate GPS module is not required in the satellite modem.

In the preferred embodiment, the satellite modem is implemented as a small isolated "black box" with its own batteries and no wired connection to the PDA. By interfacing with the PDA using bluetooth, the satellite modem can be placed at a location having a less obstructed view of the sky while the user and PDA remain at a possibly more convenient location a short distance away from the satellite modem.

Perfect message security is provided by implementing one-time pad (OTP) encryption, which has been proven to be impossible to crack if used correctly.

Emergency and concierge service is provided by forwarding so designated messages by email to remote 24/7 operators trained to respond to such messages.

Source encoding is used to allow larger text messages to be sent, to reduce typing, and to act as a spell checker.

Other objects and advantages of the present invention will become obvious as the preferred embodiments are described and discussed below.

BRIEF DESCRIPTION OF THE DRAWINGS

FIG. 7 illustrates a format embodiment of source encoded data.

DETAILED DESCRIPTION OF THE PREFERRED EMBODIMENTS

Figure 1:
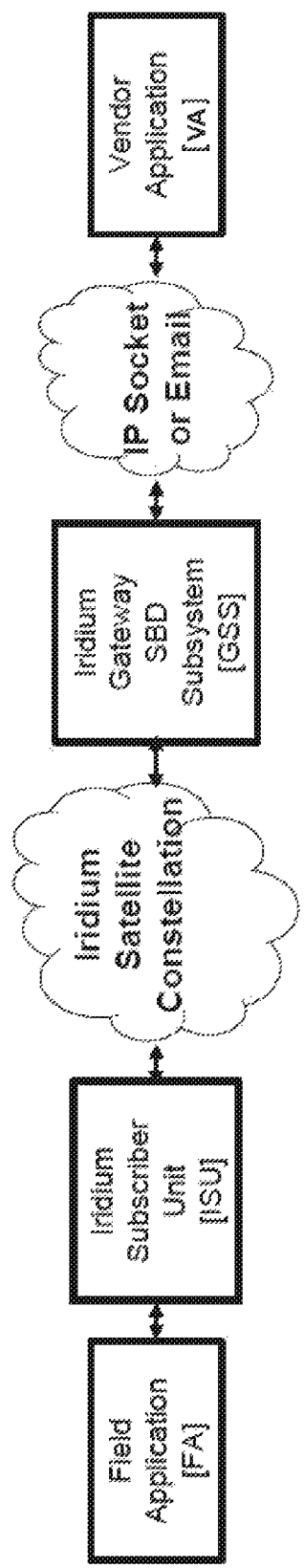
FIG. 1 is a block diagram of the Iridium SBD architecture.

Iridium's Short Burst Data (SBD) service is a simple and efficient satellite network transport system designed to transmit short data messages between field equipment and a centralized host computing system. A block diagram of the SBD architecture is illustrated in FIG. 1.

A mobile Field Application (FA) can originate a maximum message size of 340 bytes which is transmitted using the Iridium Subscriber Unit (ISU) to the Iridium Satellite Constellation. The Constellation relays the message through the Iridium Gateway SBD Subsystem (GSS), then over the Internet or leased line, to the Vendor Application (VA). The VA can send a maximum message size of 270 bytes back to the FA.

In the present invention, the FA is a custom software application on the PDA. The ISU is mounted in the satellite modem. The VA is a server and custom software installed at the vendor's location which communicates with the GSS over the Internet or leased line.

Recently, Iridium has introduced its 9602 SBD transceiver which is 69% smaller, 74% lighter, and much lower cost than their previous transceiver. This transceiver is currently an optimum choice for the preferred embodiment of the present invention.

Figure 2:
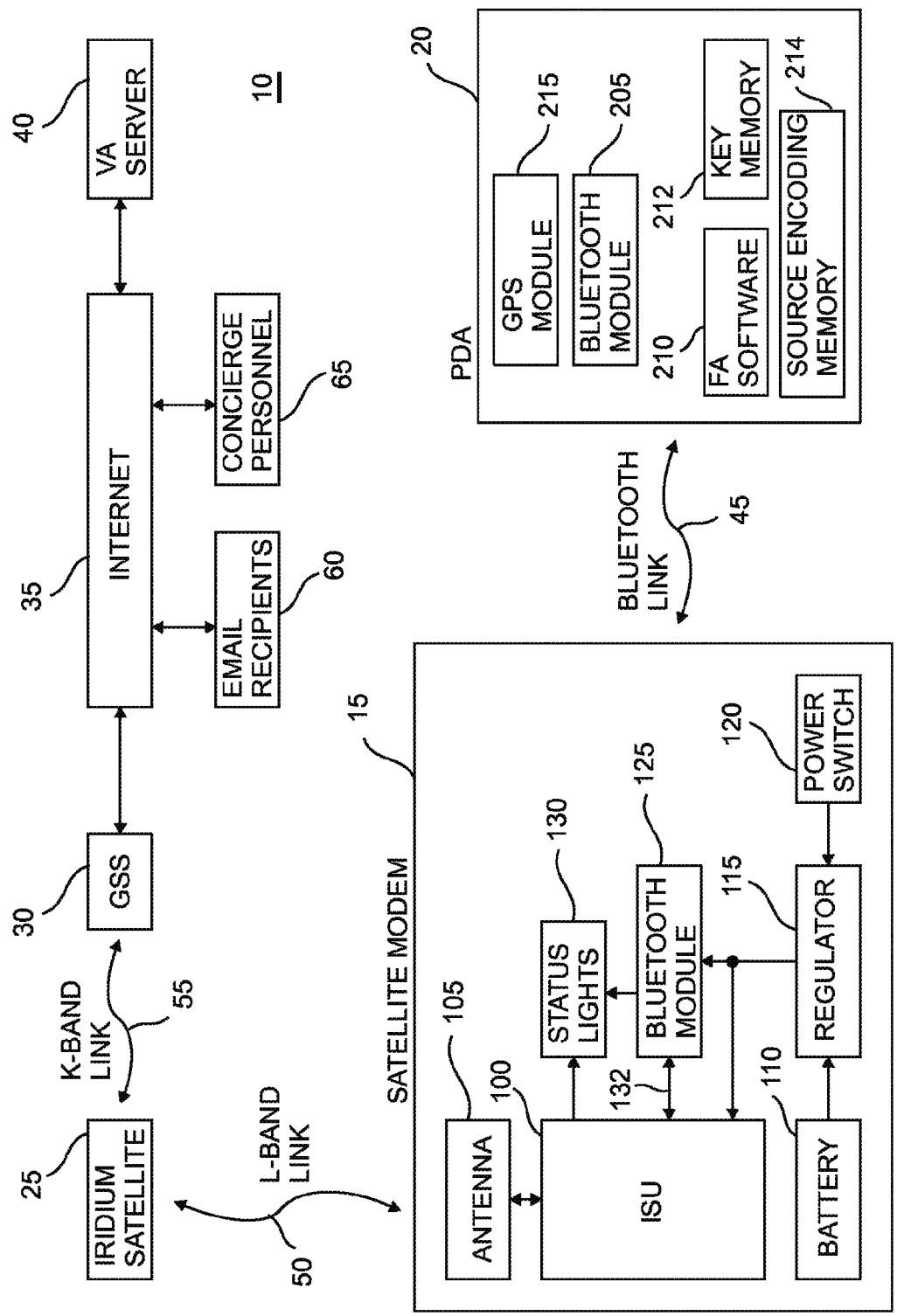
FIG. 2 is an overall system block diagram of the subject invention.

FIG. 2 illustrates a block diagram 10 of the preferred embodiment of the present invention. PDA 20 communicates with satellite modem 15 over wireless bluetooth link 45. Satellite modem 15 SBD messages are sent and received via Iridium satellite 25 over L-band link 50. Iridium satellite 25 relays SBD messages to GSS 30 over K-band link 55. GSS 30 relays SBD messages to VA server 40 via Internet 35. VA server 40 converts SBD messages to email messages which are forwarded to or received from their designated email recipients 60 via Internet 35.

Specially designated messages are routed to always available emergency and concierge personnel 65 standing by to handle these messages. To keep the cost of this service low, these messages will be simultaneously sent to multiple concierge personnel 65 who are home workers trained to respond to these messages. For example, concierge personnel 65 could forward 911 messages to the proper authorities, relay messages by phone to non-email recipients, or provide various kinds of information (such as weather forecasts) back to remote PDA users.

These specially designated messages will be sent to multiple concierge personnel 65 for redundancy purposes and a protocol will be implemented to prevent multiple concierge personnel from processing the same message. For example, all messages will be viewed by all concierge personnel and claimed by the first available concierge personnel. The remaining concierge personnel will continue to standby for other messages. During busy periods, protocols will be in place whereby off-duty concierge personnel, from a large pool of trained concierge personnel, can be activated.

Custom FA software 210 on PDA 20 controls ISU 100 in satellite modem 15 using AT commands. AT commands are used to setup a SBD communication session and to send and receive SBD messages. Custom FA software 210 interfaces with PDA 20 hardware resources such as keyboards, displays, and GPS module 215 to create and display messages. AT commands and SBD messages are sent to and received from ISU 100 using PDA 20 bluetooth module 205 and satellite modem 15 bluetooth module 125 over bluetooth link 45.

Satellite modem 15 is powered by battery 110 whose voltage is regulated by regulator 115. Power switch 120 turns regulator 115 on and off. When on, regulator 115 power is applied to ISU 100 and bluetooth module 125. Bluetooth module 125 converts bluetooth command and message signals sent and received over wireless bluetooth link 45 to serial buss 132 data for ISU 100. Status lights 130 provide the user with visual information concerning the status of battery 110, ISU 100, and bluetooth module 125. Iridium antenna 105 is connected to ISU 100 and communicates over L-band link 50 with Iridium satellite 25. All satellite modem 15 components are packaged in a small enclosure. No wired connection with PDA 20 is required.

Messages designated as being secure are coded and uncoded using One-Time Pad (OTP) encryption. In OTP encryption, each byte of plaintext message is encrypted by modular addition with a byte from a secret random key stored in key memory 212. If the key is truly random, as large as the plaintext message, never reused in whole or part, and kept secret, the ciphertext message will be impossible to decrypt or be read without knowing the key.

OTP encryption is ideal for this application because messages are short, PDAs have sufficient memory to store a large supply of keys, and OPT encryption does not increase the transmitted message size. OTP encryption is much faster and far less computationally costly than public-key encryption implementations. In contrast to OTP encryption, no public-key encryption scheme has been shown to be secure against eavesdropper with unlimited computational power. OTP encryption is secure because for any message, keys can be found that will translate the ciphertext message into any plaintext message desired. There is no information in the ciphertext which will allow the decoder to choose among the various possible plaintext messages that can be decoded.

The main requirements of OTP encryption is that the keys must be perfectly random, used once, kept secret, and destroyed after use. The PDA user and email recipient must securely share keys with each other prior to message communication. In this application, multiple key files will be formed and stored in key memory 212. Messages will designate in plaintext which key file must be used to decode the message. After decoding, the key file will be erased.

High quality perfect random keys are typically made using hardware processes based on thermal noise, audio noise, or the like. However, for this application a simple program can be written as either part of FA software 210 or as a stand alone PC application. The key generation procedure is based on first creating a file of equally probable key bytes and then shuffling them.

In the world of business, financial data, banking account numbers, credit card numbers, strategic negotiations, and the like must be kept confidential both short term and long term. Risks of industrial espionage, compromise of trade secrets, and competitive intelligence from hackers and eavesdroppers are always present and a concern to businessmen. To reduce these concerns, it is important to devise computer generated OTP keys that are impossible to duplicate by an adversary.

Figure 3:
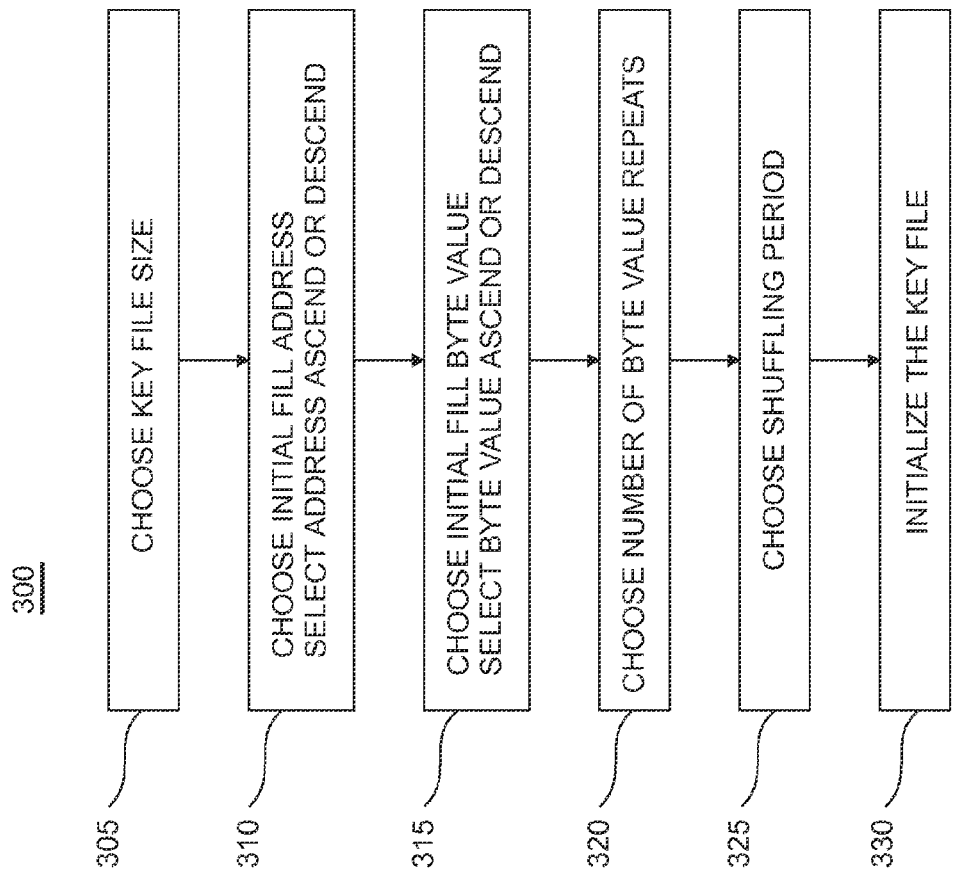
FIG. 3 illustrates the initialization steps prior to creating the OTP encryption key file.

A phenomenon common to chaos theory called the butterfly effect, also known as sensitive dependence on initial conditions, characterizes a processes in which a small change in the initial conditions can drastically change the long-term outcome of the process. Such a process is illustrated in FIG. 3 where the user can arbitrarily select different initial conditions, each of which will generate a completely different OTP key file. Prior to launching the key file generation process, the user fills out a short menu of starting point choices (including shuffling period) and then launches the process. Other menus of starting point choices could also be devised.

FIG. 3 illustrates a flow diagram 300 for creating the key file. The first step is to choose a key file size 305. For example, choose a file size of 1 megabyte. The second step is to choose the initial fill address 310 and indicate if the fill address will ascend or descend. For example, choose the initial address as 749,200 ascending. The third step is to choose the initial fill byte value 315 and indicate if byte values will ascend or descend. For example, choose the initial byte value as 137 descending. The fourth step is to choose the number of byte value repeats 320. For example, repeat each byte twice before its byte value is decremented. The fifth step is to choose the shuffling period 325. For example, choose a shuffling period of 1 hour. The last step is to initialize the key file 330.

Figure 4:
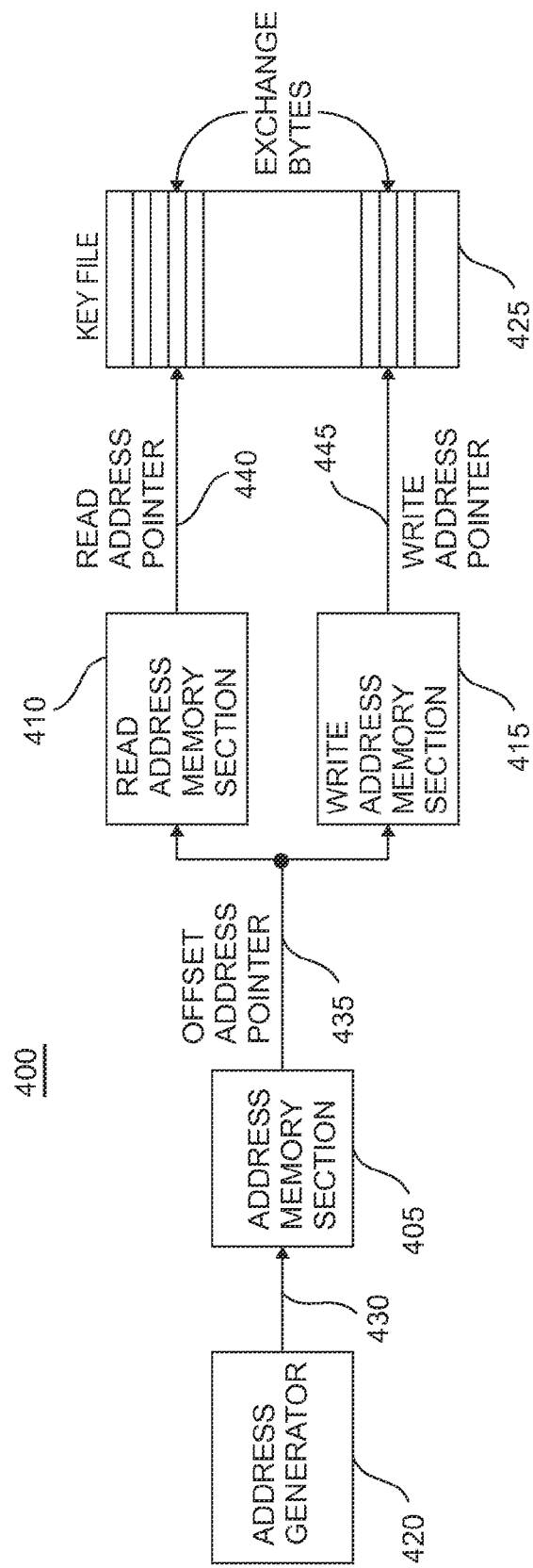
FIG. 4 illustrates a software block diagram for creating the OPT encryption key file.

In this example, byte value 137 is written to addresses 749,200 and 749,201. Byte value 136 is written to addresses 749,202 and 749,203. This fill process is repeated until all 1,048,576 addresses are written. Note that all byte values from 00h to FFh are repeated 4096 times so each byte is equally probable. That is, once randomized by shuffling, the key byte values will have a uniform probability distribution as required for OTP keys. Next, this initialized key file is shuffled to randomize the uniformly distributed byte values using procedure block diagram 400 illustrated in FIG. 4.

Large sections of PC memory are selected as address memory section 405, read address memory section 410, and write address memory section 415. Address generator 420 creates consecutive addresses 430 that cover address memory section 405 and roll over upon reaching this section's max address. It is assumed that these memory sections are in PC random access memory (RAM), contain any random data, will be read only, and their data values may change during the course of this shuffling procedure. Reading this memory will be similar to common memory dump code which simply reads values of RAM memory without changing it.

For each address 430 generated by address generator 420, address memory section 405 data at address 430 is used as offset address pointer 435 for read address memory section 410 and write address memory section 415. Read address memory section 410 data at offset address pointer 435 is used as the read address pointer 440 for key file 425. Write address memory section 415 data at offset address pointer 435 is used as write address pointer 445 for key file 425. Key file 425 byte value at read address pointer 440 is written to key file 425 write address 445 and key file 425 byte value at write address pointer 445 is written to key file 425 read address 440. This process of randomly exchanging key file 425 byte values shuffles its byte data.

This shuffling program is allowed to run for a long period of time in either the foreground, background, or even at different times or on different days. The result is a large random byte key file 425 that would be impossible to duplicate. Key file 425 can then be separated into multiple small SBD message size key files and securely distributed to PDA users and secure message recipients. As long as these key files are kept secure until used and erased after use, OTP encrypted messages will be 100% secure. For maximum security, all SBD plaintext messages could be byte stuffed with preceding and postceding 00h bytes or other "don't care" bytes to form maximum length SBD messages prior to transmission.

A SBD message from the FA is limited to 340 bytes and a message back to the FA is limited to 270 bytes which limits the size of text messages that can be communicated. One way to greatly increase message size, yet still use only the maximum specified number of bytes, is to source encode the messages. Source encoding is a technique that compresses the data from a source in order to transmit it more efficiently.

For mobile originated (MO) messages, the source encoder would be part of FA software 210 and would source encode user text messages (prior to encryption for encrypted messages) and send them to satellite modem 15. The source decoder would be either part of custom software in VA server 40 or would be part of email recipients 60 application. In both cases, source encoded messages would be source decoded back into original text messages. Encrypted messages would first be decrypted and then source decoded on email recipients 60 PDA.

For mobile terminated (MT) encrypted messages, email recipients 60 would source encode and then encrypt their text messages prior to emailing them to VA server 40. For MT unencrypted messages, the source encoder would either be part of custom software in VA server 40 or would be part of email recipients 60 application. In both cases, text messages would be source encoded. The source decoder would be part of FA software 210 and would decode message data back into original text messages after decrypting (if encrypted) and displaying them to the user.

There are many different methods of source encoding. The most common technique is to encode data to a zip file. Zip files are not a good solution for this application because the entire text file must first be generated and then zipped.

In this invention, a source encoding technique is disclosed that encodes the message as it is typed, reduces the typing required, provides spell checking as it is typed, and provides the user with a remaining byte (or character) count. With source encoding, much larger messages can be sent and received without having to resort to "texting slang" in which abbreviations like "u" is used for "you" and "r" is used for "are". Instead, users can communicate using normal language instead of slang not universally understood by everyone.

SBD messages are transmitted as 8-bit bytes. Each byte of ASCII text is represented by a byte whose most significant bit (MSB) is zero followed by a 7-bit text character. Therefore, one bit of every text byte is wasted assuming it is known that text is being transmitted.

Figure 5:
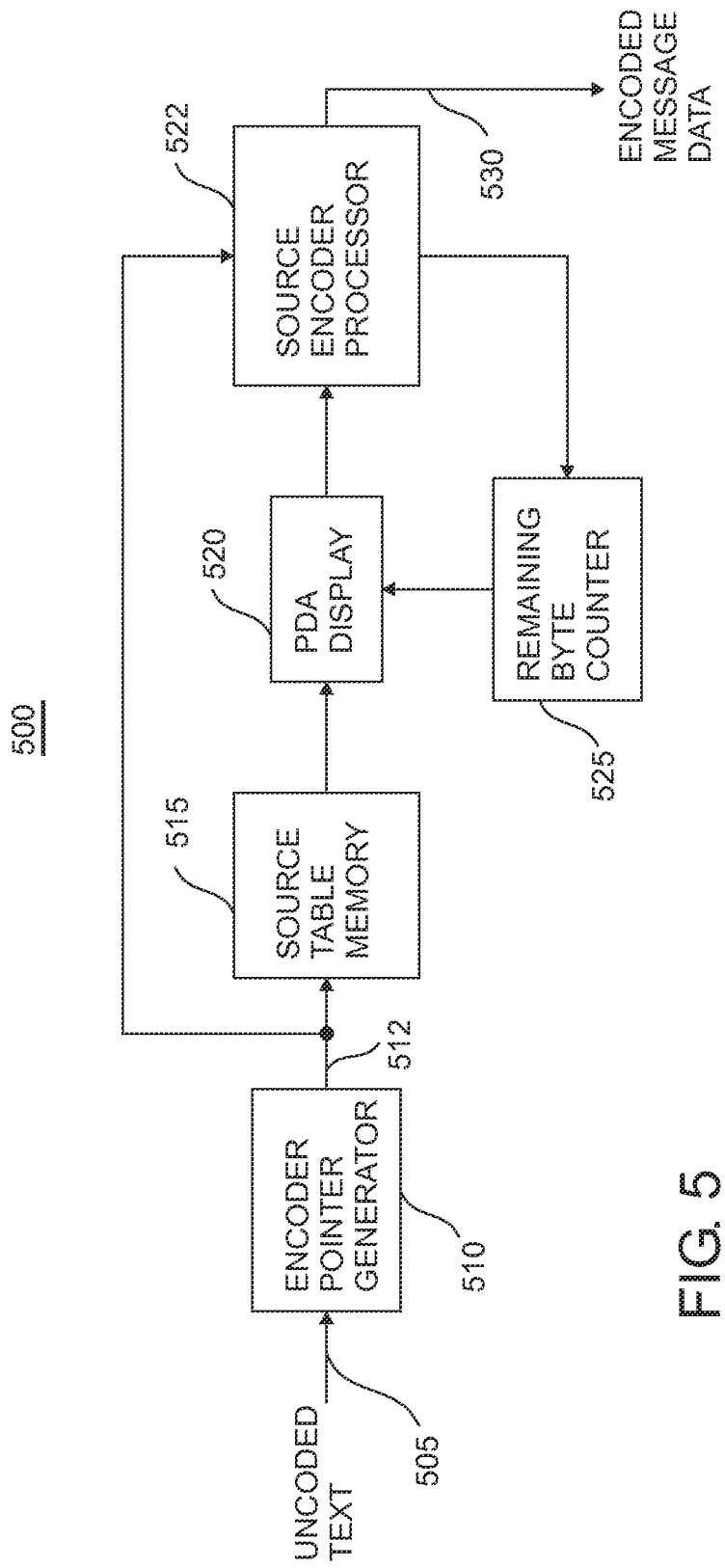
FIG. 5 illustrates a software block diagram of the source encoder.
Figure 6:
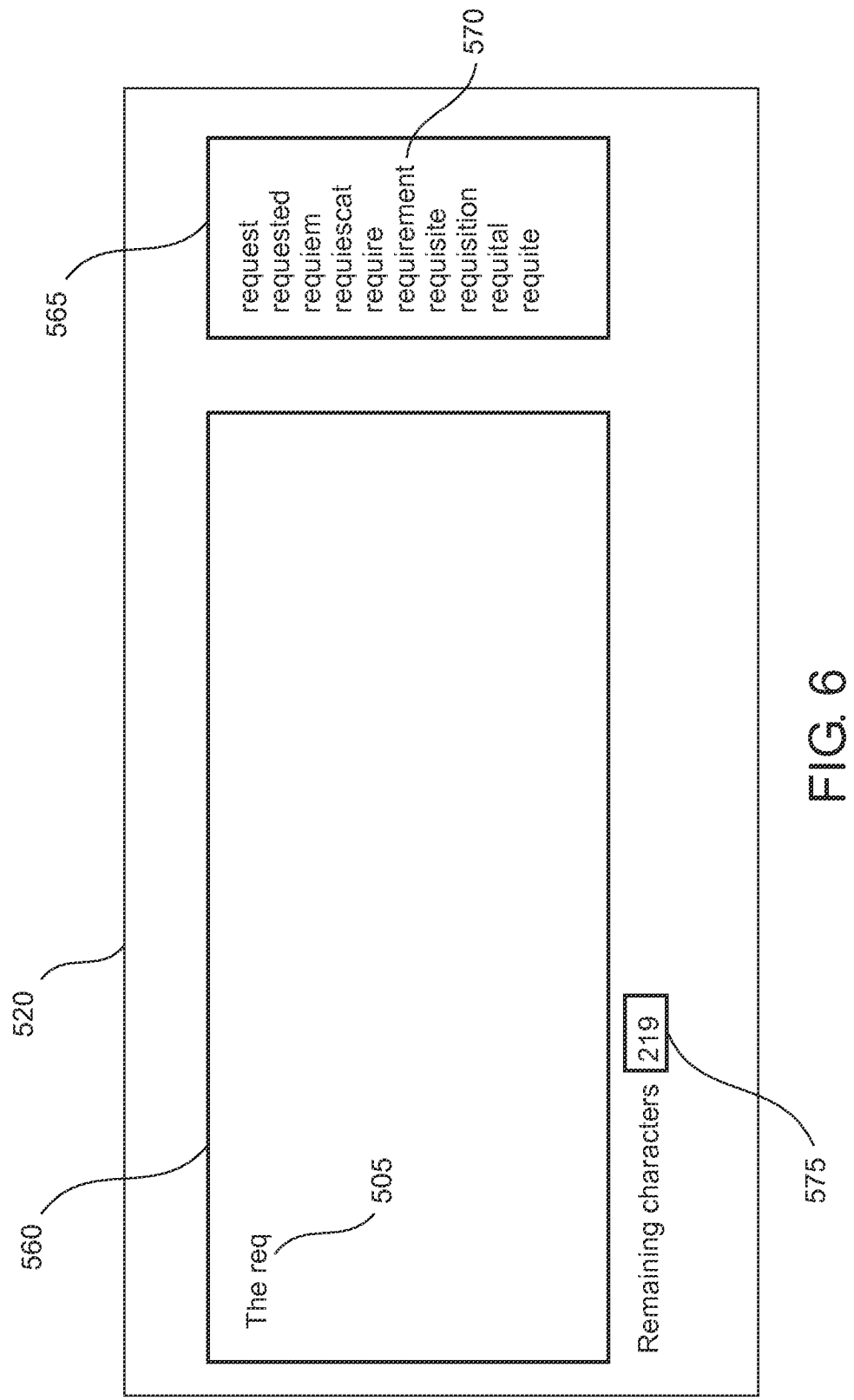
FIG. 6 illustrates the text and selection windows of the PDA display.

FIG. 5 illustrates source encoder 500 of the subject invention. When source encoder 500 is activated, each character of uncoded text 505 typed by the user is displayed as normally typed in text window 560 on PDA display 520 as illustrated in FIG. 6.

As each character is entered, encoder pointer generator 510 looks up a list of words in source table memory 515, starting with the characters typed, and displays possible words or phrases in selection window 565 on PDA display 520. As the user types more characters, the displayed choices becomes smaller. At any time, the user can select one of the words in selection window 565 which will complete that word in text window 560.

For example, if the user selects the word "requirement" 570, "req" of uncoded text 505 typed in text window 560 will be completed to the word "requirement". Byte counter 525 counts the number of encoded bytes, subtracts this number from the maximum allowed, and displays the result in remaining characters window 575 on PDA display 520 to inform the user how much message room is left.

Source encoding must reside on email recipients 60 PDA to obtain maximum MT message benefit. When on VA server 40, email recipients 60 are unaware when their uncoded message exceeds maximum size. However, a smaller portion of oversized uncoded MT messages will be truncated if source encoding is at least implemented as part of VA server 40 custom software.

The text being typed is encoded using a format such as the data format illustrated in FIG. 7. For the example illustrated in FIG. 6, the word "requirement" would be formatted into a 2-byte data word whose 3-bit MSB data format is 010 and whose remaining 13 bits are pointer address 512 of word "requirement" in source table memory 515. In this example, the 12-byte uncoded word text "requirement" plus following space has been source encoded into a 2-byte data word.

As the text message is typed by the user, source encoder processor 522 encodes text into 2-byte data words. If characters typed are not in source table memory 515, each double character is encoded into a 2-byte data word whose 3-bit MSB data format is 00X. The X is the MSB of the next 6 bits which represents the first text character typed. The remaining 7 bits represent the second text character typed.

Note that there is no penalty for using this source encoder. With or without source encoding, two text characters require two bytes to be transmitted. However, for words or phrases in source table memory 515, many uncoded bytes of text can be replaced with 2 bytes of encoded data. Using 3-bit MSB data format 011, an entire phrase and ending space can be encoded. For example, the 26-byte uncoded phase text "careful what you wish for" plus space can be source encoded into a 2-byte data word.

Using a 13-bit pointer address 512, 8K text words and 8K text phrases can be placed in source table memory 515. Source table memory 515 can be divided into two 8K pages for text words and text phrases respectively. Encoder pointer generator 510 creates the text/page MSB address and 13-bit pointer address 512 that selects either the text word or text phrase stored in source table memory 510. If neither the text phrase or text word is in source table memory 510, the two text characters are sent directly to source encoder processor 522 which converts uncoded text 505 to encoded message data 530.

Figure 8:
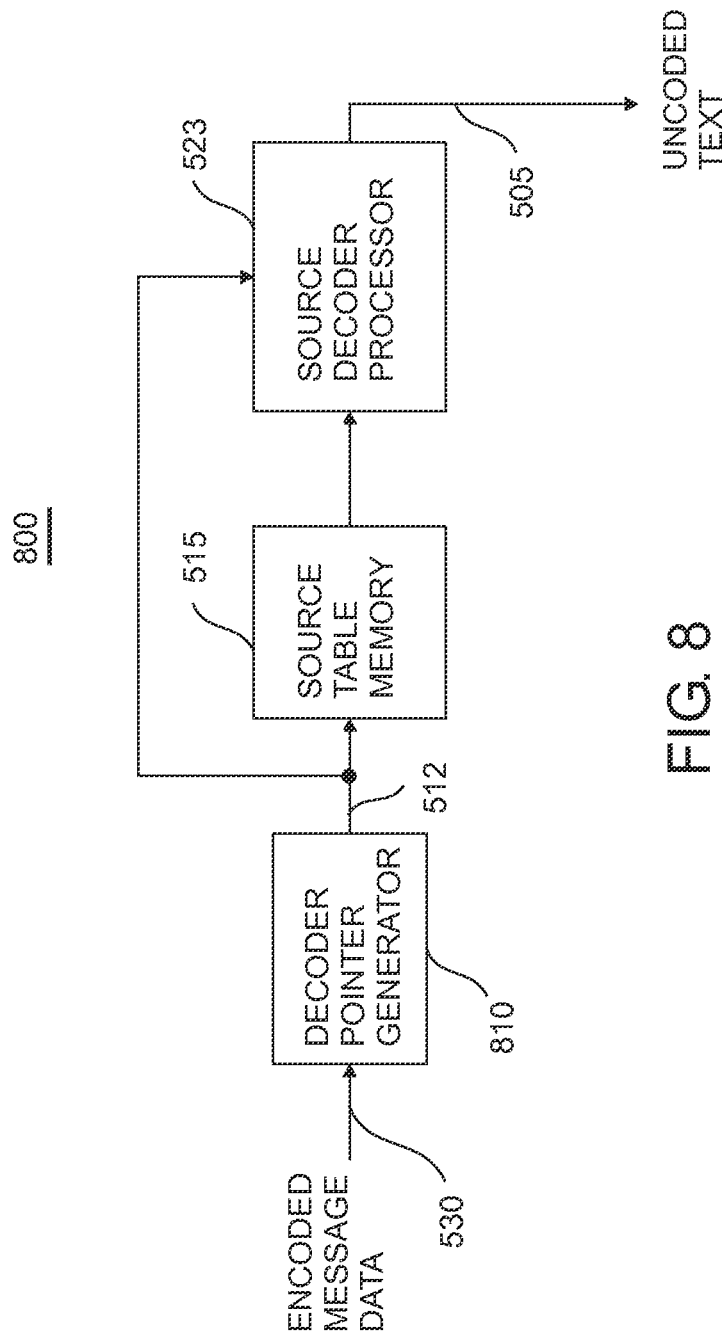
FIG. 8 illustrates a software block diagram of the source decoder.

FIG. 8 illustrates source decoder 800 of the subject invention. Transmitted encoded message data 530 is parsed by decoder pointer generator 810 into 2-byte words. The 3-bit MSB data format address is decoded to determine if this 2-byte word represents text characters, text words, or text phrases as illustrated in FIG. 7. For text words or text phrases, the text/page MSB and 13-bit pointer address 512 is generated. Pointer address 512 looks up the encoded text word or text phrase which is combined with text characters in source decoder processor 523 to convert encoded message data 530 back into uncoded text 505.

Message data formats other than illustrated in FIG. 7 can be devised. Message data could be parsed, for example, into 5-nibble words (20-bits) composed of a 4-bit MSB data format and 16-bit pointer address. This would allow 64K text words and 64K text phrases to be encoded into 5-nibble words. Also, message information other than the text message portion, such as recipient addresses, could also be included using other message data formats.

There are many resources available that list the most common words and phrases in various languages. The first message byte sent would define which list is used for the message or if no source encoding is used. Lists could also be updated periodically based on evolving new words or figures of speech.

Although the preferred embodiments of the present invention have been illustrated and described in detail, it will be readily apparent to those skilled in the art that various modifications may be made therein without departing from the spirit of the invention. For example, multiple different FA software programs can be written for the PDA to implement various features. Canned text messages can be authored and saved for quick transmission. Applications that automatically send the PDA's current GPS location would be useful for hikers, boaters, and aircraft flights.

Other methods of creating OTP keys are possible including the user just manually choosing (and communicating them to the recipient) a random key byte for each plaintext byte in a short message. Also, key files could be sent to recipients via their office or home PCs using existing public-key encryption or over a virtual private network (VPN). This PDA OTC encryption feature disclosed in the present invention could also be offered for other types of PDA communications by using larger key files and writing FA software to implement OTC encryption with text messaging, Internet data, or voice calls.

Many options are available for packaging style, construction materials, and color of satellite modem 15. Optionally, a GPS module could be provided in satellite modem 15 so as to provide GPS location when used with a laptop or netbook PC that doesn't contain a built-in or external GPS module.

Many other simple modifications are also possible without departing from the spirit of the invention.

What is claimed is:

1. A method of communication utilizing a satellite communications network comprising:
    compressing a text message to form an encoded text message, said compressing operation including:
        performing auto-completion of a word of said text message as characters of said word are entered at a mobile communication device; and
        formatting said word of said text message with a pointer address to a first source table associated with said mobile communication device, said first source table having said word corresponding to said pointer address stored therein;
    transmitting said encoded text message from said mobile communication device to a short range radio module within a satellite modem using a short range wireless communication link;
    transmitting said encoded text message as a satellite message from a short burst data transceiver within said satellite modem to a satellite within said satellite communications network using a long range wireless communication link, said short range radio module being in communication with said short burst data transceiver;
    relaying said satellite message via said satellite communications network for receipt at a receiving unit; and
    decompressing said encoded text message at said receiving unit, said decompressing operation including utilizing said pointer address to access a second source table associated with said receiving unit to recover said word of said text message stored in said second source table.

2. A method as claimed in claim 1 wherein said short range wireless communication link is a Bluetooth link.

3. A method as claimed in claim 1 wherein said long range wireless communication link is an L-band link.

4. A method as claimed in claim 1 further comprising:
    encrypting said encoded text message at said mobile communication device to form an encrypted encoded text message prior to transmitting said encrypted encoded text message from said mobile communication device; and
    decrypting said satellite message at said receiving unit to recover said encoded text message.

5. A method as claimed in claim 4 wherein said encrypting and decrypting activities utilize one-time pad encryption.

6. A method as claimed in claim 1 further comprising:
    receiving said satellite message from said satellite communications network at a server system;
    converting said satellite message to said text message at said server system; and
    forwarding said text message from said server system toward said receiving unit.

7. A method as claimed in claim 6 wherein said forwarding operation forwards said text message to said receiving unit as an email message.

8. A method as claimed in claim 6 further comprising:
    determining that said text message is an emergency message; and
    said forwarding operation routes said text message for receipt at said receiving unit associated with emergency personnel.

9. A method as claimed in claim 6 further comprising:
    determining that said text message is intended for receipt by concierge personnel;

said forwarding operation routes said text message for receipt at said receiving unit associated with said concierge personnel;

transmitting a response message from said receiving unit to said short burst data transceiver via said satellite communications network; and transmitting said response message from said short range radio module to said mobile communication device.

10. An apparatus for enabling communication of messages via a satellite communications network comprising:

a short range radio module for transmitting and receiving said messages to and from a wireless communication device;

a short burst data transceiver coupled to said short range radio module for transmitting and receiving short burst data messages to and from a remote location via said satellite communications network;

an antenna coupled to said short burst data transceiver;

a power supply for supplying power to said radio module; and an enclosure housing said short range radio module, said short burst data transceiver, said antenna, and said power supply, wherein:

a first text message is encoded in said wireless communication device to form a first encoded text message and transmitted from said wireless communication device utilizing a short range wireless protocol and received by said short range radio module is transmitted from said short burst data transceiver as a first satellite message to a satellite within said satellite communications network, wherein transmission of said first satellite message occurs utilizing a long range wireless protocol; and a second satellite message communicated via said satellite communications network utilizing said long range wireless protocol and received at said short burst data transceiver is transmitted as a second encoded text message from said short range radio module to said wireless communication device and decoded to form a second text message in said wireless communication device, wherein transmission of said second encoded text message occurs utilizing said short range wireless protocol, wherein said encoded and decoded operation includes:

performing auto-completion of a word of said first text message as characters of said word are entered at said wireless communication device;

formatting said word of said first text message with a pointer address to a source table associated with said wireless communication device, said source table having said word corresponding to said pointer address stored therein; and decoding said second encoded text message at said wireless communication device, said decoding operation including utilizing said pointer address to access said source table associated with said wireless communication device to recover said word of said second text message stored in said source table.

11. An apparatus as claimed in claim 10 herein said short range wireless protocol is a Bluetooth communication protocol.

12. An apparatus as claimed in claim 10 wherein said long range wireless protocol is an L-band communication protocol.

13. A system for enabling communication utilizing a satellite communications network, said system comprising:

a mobile communication device comprising a processor configured to generate a text message;

a memory element containing executable code, said executable code instructing said processor to perform an operation comprising:

encrypting said text message at said mobile communication device to form an encrypted text message; and creating a key file of encryption keys having a uniform probability distribution, said creating operation comprising:

performing at least one of choosing a size of said key file, choosing an initial fill address and a first ascent or descent indicator for said fill address, choosing an initial fill byte value and a second ascent or descent indicator for said fill byte value, choosing a number of byte value repeats, choosing a shuffling period, and initializing said key file;

shuffling said key file in accordance with said shuffling period to generate said uniform probability distribution of said encryption keys;

separating said key file into multiple sets of said encryption keys; and securely distributing at least one of said multiple sets of said encryption keys to a receiving unit;

a first short range radio module in communication with said processor for transmitting said encrypted text message utilizing a short range wireless protocol; and a satellite modem apparatus comprising:

a second short range radio module for receiving said encrypted text message from said mobile communication device;

a short burst data transceiver coupled to said second short range radio module for transmitting said encrypted text message as a short burst data message, utilizing a long range wireless protocol, to a receiving unit at a remote location via said satellite communications network;

an antenna coupled to said short burst data transceiver;

a power supply for supplying power to said second short range radio module; and an enclosure housing said second short range radio module, said short burst data transceiver, said antenna, and said power supply.

14. A system as claimed in claim 13 wherein said executable code instructs said processor to perform one-time pad encryption to form said encrypted text message, said executable code instructing said processor to perform operations of said one-time pad encryption comprising:

selecting an encryption key from a key file stored in said memory element;

utilizing said encryption key to encrypt said text message; and erasing said encryption key from said key file following said encrypting operation.

15. A system as claimed in claim 13 wherein said executable code instructs said processor to perform a further operation prior to said encrypting operation comprising compressing said text message to form an encoded text message for transmission as a short burst data message via said satellite communication network such that said encrypted text message is an encrypted and encoded text message.

16. A system as claimed in claim 13 wherein said mobile communication device further comprises a memory element containing executable code, said executable code instructing said processor to perform an operation comprising compressing said text message to form an encoded text message for transmission as a short burst data message via said satellite communication network, wherein said compressing operation includes:
  performing auto-completion of a word of said text message as characters of said word are entered at said mobile communication device; and
  formatting said word of said text message with a pointer address to a first source table associated with said mobile communication device, said first source table having said word corresponding to said pointer address stored therein.

\* \* \* \* \*